United States Patent
Neale

(10) Patent No.: US 7,255,404 B2
(45) Date of Patent: Aug. 14, 2007

(54) SEAT FRAME PANEL FOR ATTACHING A FABRIC SUSPENSION

(75) Inventor: Colin G. Neale, Northville, MI (US)

(73) Assignee: Intier Automotive Inc., Aurora, Ontario (CA)

( * ) Notice: Subject to any disclaimer, the term of this patent is extended or adjusted under 35 U.S.C. 154(b) by 50 days.

(21) Appl. No.: 10/507,865

(22) PCT Filed: Mar. 24, 2003

(86) PCT No.: PCT/US03/08987

§ 371 (c)(1),
(2), (4) Date: Jun. 15, 2005

(87) PCT Pub. No.: WO03/082628

PCT Pub. Date: Oct. 9, 2003

(65) Prior Publication Data

US 2005/0236884 A1    Oct. 27, 2005

(51) Int. Cl.
A47C 31/02  (2006.01)
A47C 7/02   (2006.01)
A47C 7/24   (2006.01)
A47C 7/26   (2006.01)

(52) U.S. Cl. .............................. 297/452.56; 297/218.1; 297/218.3; 297/218.5

(58) Field of Classification Search ........... 297/452.56, 297/218.1, 218.3, 218.5
See application file for complete search history.

(56) References Cited

U.S. PATENT DOCUMENTS

| | | | |
|---|---|---|---|
| 3,844,612 A | | 10/1974 | Borggren et al. |
| 4,492,408 A | * | 1/1985 | Lohr ................. 297/452.56 X |
| 4,583,783 A | | 4/1986 | Kanai .................... 297/452.56 |
| 4,834,458 A | * | 5/1989 | Izumida et al. ..... 297/452.56 X |
| 4,883,320 A | * | 11/1989 | Izumida et al. ........ 297/452.56 |
| 5,013,089 A | | 5/1991 | Abu-Isa et al. |
| 5,328,248 A | * | 7/1994 | Nishiyama ............. 297/452.56 |
| 5,338,091 A | * | 8/1994 | Miller ............... 297/452.56 X |
| 6,152,534 A | * | 11/2000 | Maeda et al. .......... 297/452.56 |
| 6,231,125 B1 | * | 5/2001 | Maeda et al. .......... 297/452.56 |
| 6,375,269 B1 | | 4/2002 | Maeda et al. .......... 297/452.56 |
| 6,378,949 B1 | | 4/2002 | Maeda et al. .......... 297/452.56 |
| 6,604,792 B1 | * | 8/2003 | Picard ................... 297/452.56 |
| 6,676,218 B2 | * | 1/2004 | Fujita et al. ........ 297/452.56 X |
| 6,722,742 B2 | * | 4/2004 | Potes et al. ............ 297/452.56 |
| 2002/0060493 A1 | * | 5/2002 | Nishino et al. ........ 297/452.56 |

FOREIGN PATENT DOCUMENTS

EP    1 048 246    11/2000

* cited by examiner

Primary Examiner—Rodney B White
(74) Attorney, Agent, or Firm—Clark Hill PLC

(57) ABSTRACT

A seat assembly for an automotive vehicle is provided utilizing a membrane suspension for supporting an occupant seated on the seat assembly. The seat assembly includes a seat cushion and a seat back operatively coupled to the seat cushion for movement between a plurality of reclined positions. Both the seat back and seat cushion are similarly configured each having a frame extending between interconnected and spaced apart side members. The membrane suspension includes opposite terminal edges each fixedly secured to one of the side members to support the membrane suspension in tension between the side members. A rigid panel having an upstanding wall is fixedly secured to the seat back and seat cushion frames. The wall increasingly tensions the membrane suspension during installation of the panel.

8 Claims, 4 Drawing Sheets

SEAT FRAME PANEL FOR ATTACHING A FABRIC SUSPENSION

BACKGROUND OF THE INVENTION

1. Field of the Invention

The present invention relates to a seat assembly for an automotive vehicle, and more particularly, to a seat frame panel for covering a portion of a seat frame and for applying tension to a fabric suspension supported by the seat frame.

2. Description of Related Art

Automotive vehicles typically include seat assemblies for supporting occupants within the vehicles. Seat assemblies comprise a seat cushion and a seat back for supporting the back of an occupant seated upon the seat cushion and operatively coupled to the seat cushion for pivotal adjustment between a plurality of reclined positions. Typically, each of the seat back and the seat cushion include a rigid frame and a foam pad supported on the frame and encased by a fabric trim cover for comfortably supporting the occupant.

The seat back and seat cushion may further include a fabric membrane suspension fixedly secured in tension to the frame's perimeter. The membrane suspension presents a seating surface for supporting the occupant thereupon. Construction of the seat back and the seat cushion utilizing the membrane suspension is labor intensive, usually requiring a mechanical or powered assist to stretch the membrane suspension and, at the same time, allow the membrane suspension to be fixedly secured to the frame to maintain the resulting tension in the membrane suspension.

Accordingly, it remains desirable to provide a seat frame design that allows simple, low-effort installation of the membrane suspension to the seat back or seat cushion frame.

SUMMARY OF THE INVENTION

According to one aspect of the invention, a seat assembly for use in supporting an occupant in an automotive vehicle is provided comprising a frame extending between interconnected and spaced apart side members and a membrane suspension extending between and fixedly secured to the side members for supporting the occupant of the seat assembly. The seat assembly further includes a panel fixedly secured to the seat frame for concealing a portion of the seat frame. The panel includes a rib projecting outwardly from the panel and pressing against the membrane suspension for engaging, deflecting and tensioning the membrane suspension between the side members during assembly of the panel to the side members of the seat frame.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
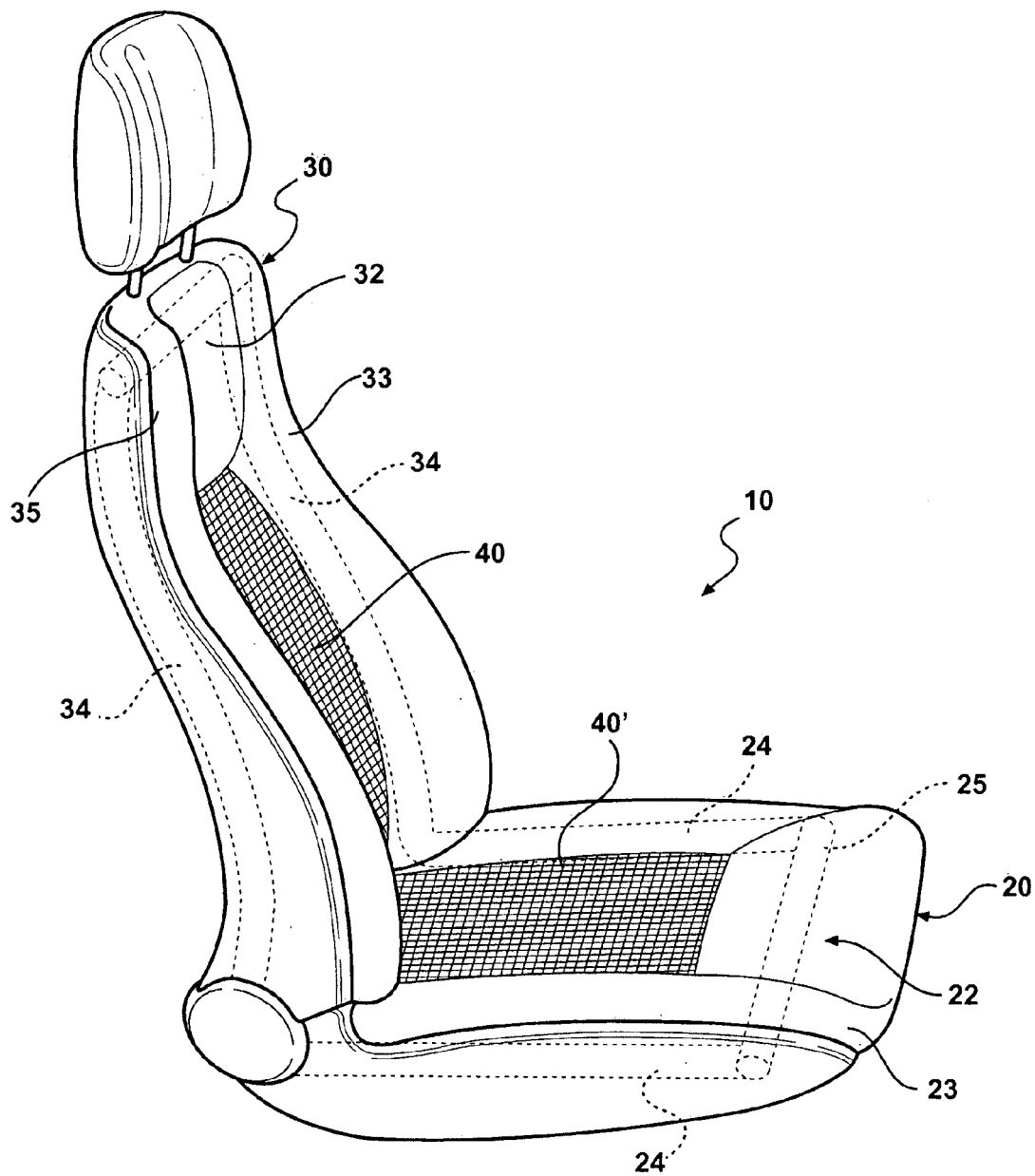
FIG. 1 is a perspective view of a seat assembly incorporating an embodiment of the present invention.

Referring to the figures, FIG. 1 illustrates a seat assembly 10 for supporting an occupant within an automotive vehicle according to one embodiment of the present invention. The seat assembly 10 includes a seat cushion 20 for supporting an occupant seated on the seat assembly 10 and a seat back 30 for supporting the back of the seated occupant. The seat back 30 may be operatively coupled to the seat cushion 20 for pivotal adjustment of the seat back 30 relative to the seat cushion 20 between a plurality of reclined seating positions as is commonly known in the art. The seat cushion 20 and the seat back 30 are similarly constructed, each including a rigid frame 22, 32 for supporting a U-shaped cellular foam pad 23, 33 encased by a fabric trim cover. Each of the frames 22 and 32 include a cross member 25, 35 extending between and interconnecting spaced apart side members 24 and 34, respectively. The frames 22, 32 may be formed from bent tubing, as shown in the figures, or constructed by welding stamped members or a combination of bent tubing and stamped members, as commonly practiced by those of ordinary skill in the art.

Figure 2:
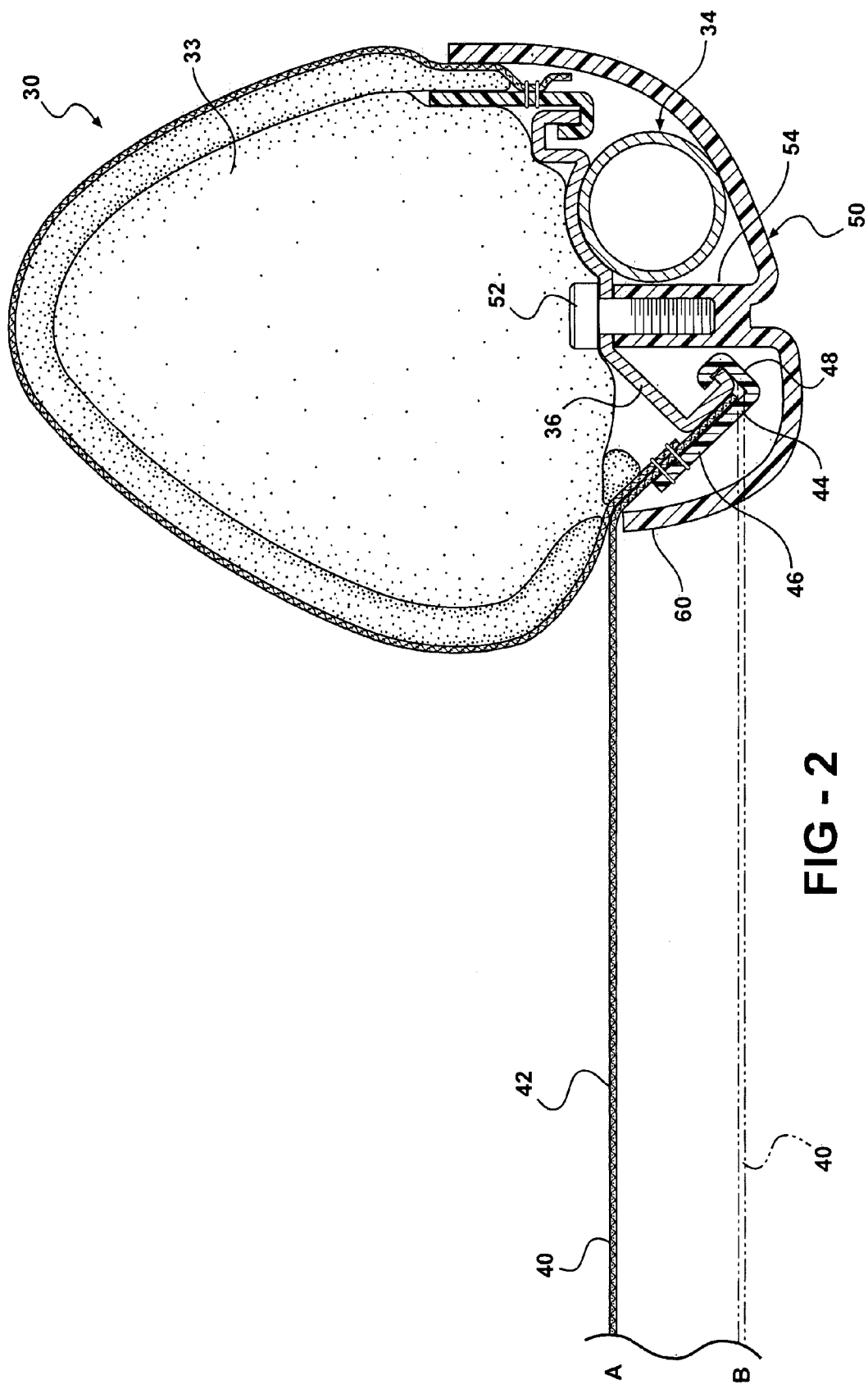
FIG. 2 is a cross sectional view of a seat back of the seat assembly.

In FIG. 2, a partial cross section of the seat back 30 is shown. Only one half or side of the seat back 30 is shown, however, it should be appreciated that the opposite half or side is a mirror image of that shown. A first flange 36 extends outwardly from each side member 34 of the seat back 30. A membrane suspension 40 presenting a seating surface 42 for supporting the back of the occupant seated on the seat assembly 10 extends in tension between the side members 34. More specifically, the membrane suspension 40 includes terminal edges 44 each generally aligned with one of the respective side members 34. An extruded J-strip 46 having a hooked end 48 is sewn or formed along each edge 44. The hooked end 48 is adapted to interlockingly engage the first flange 36, and thereby, fixedly support the membrane suspension 40 in tension between the side members 34 of the seat back 30. Alternatively, the membrane suspension 40 may be fixedly secured to the side members 34 by various types of coupling members, such as by passing bent hogrings through corresponding apertures formed along the edges 44 and the respective side members 34.

Figure 4:
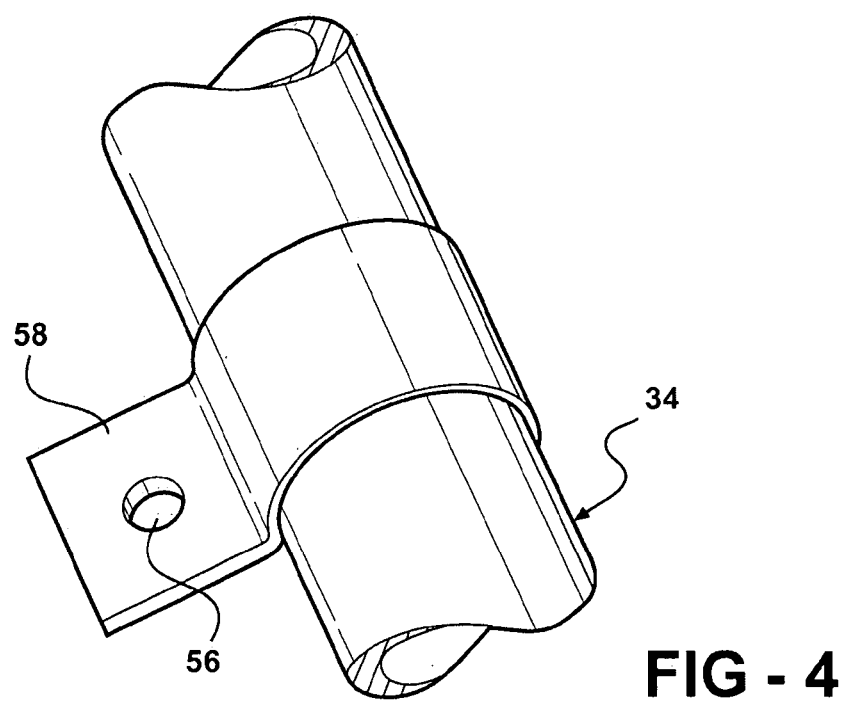
FIG. 4 is a partial perspective view of a side member in a second embodiment of the present invention.
Figure 5:
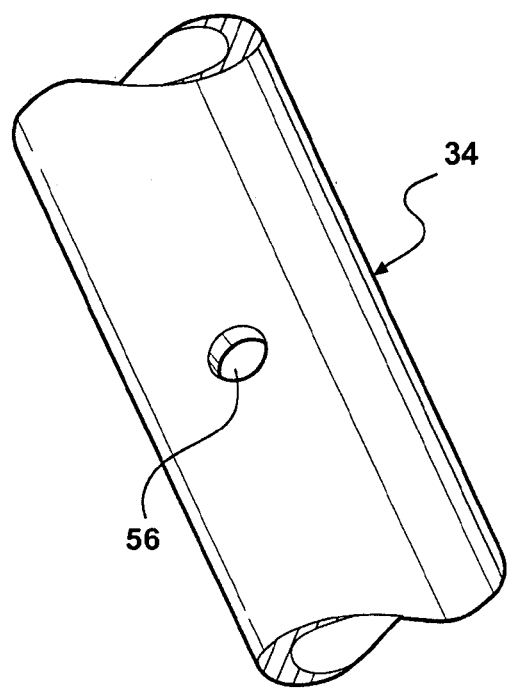
FIG. 5 is a partial perspective view of a side member in a third embodiment of the present invention.

A generally rigid trim panel 50 is fixedly assembled to the side members 34 of the seat back 30 by bolts 52 passing through a boss 54 formed in the panel 50 and a corresponding aperture formed in the first flange 36. Alternatively, as shown in FIG. 4, the bolt 52, or other type of attachment member, may pass through the boss 54 and an aperture 56 formed in a separate bracket 58 welded to the side member 34 or, as shown in FIG. 5, the aperture 56 may be formed in the side member 34 itself. An upstanding rib or wall 60 projects outwardly from the panel 50 and presses against the membrane suspension 40 to increase the tension in the membrane suspension 40 during installation of the panel 50 to the side members 34. More specifically, as the bolts 52 are driven into the side members 34 during assembly of the panel 50 to the seat back 30, the wall 60 increasingly tensions the membrane suspension 40 to a predetermined level of tension. The wall 60 displaces the membrane suspension 40 from the position indicated as A in FIG. 2 to the position indicated as B in FIG. 2 during assembly of the panel 50 to the side members 34, thereby effectively shortening the length of the membrane suspension 40 extending between the opposing side members 34 and thus increasing the tension in the membrane suspension 40.

Figure 3:
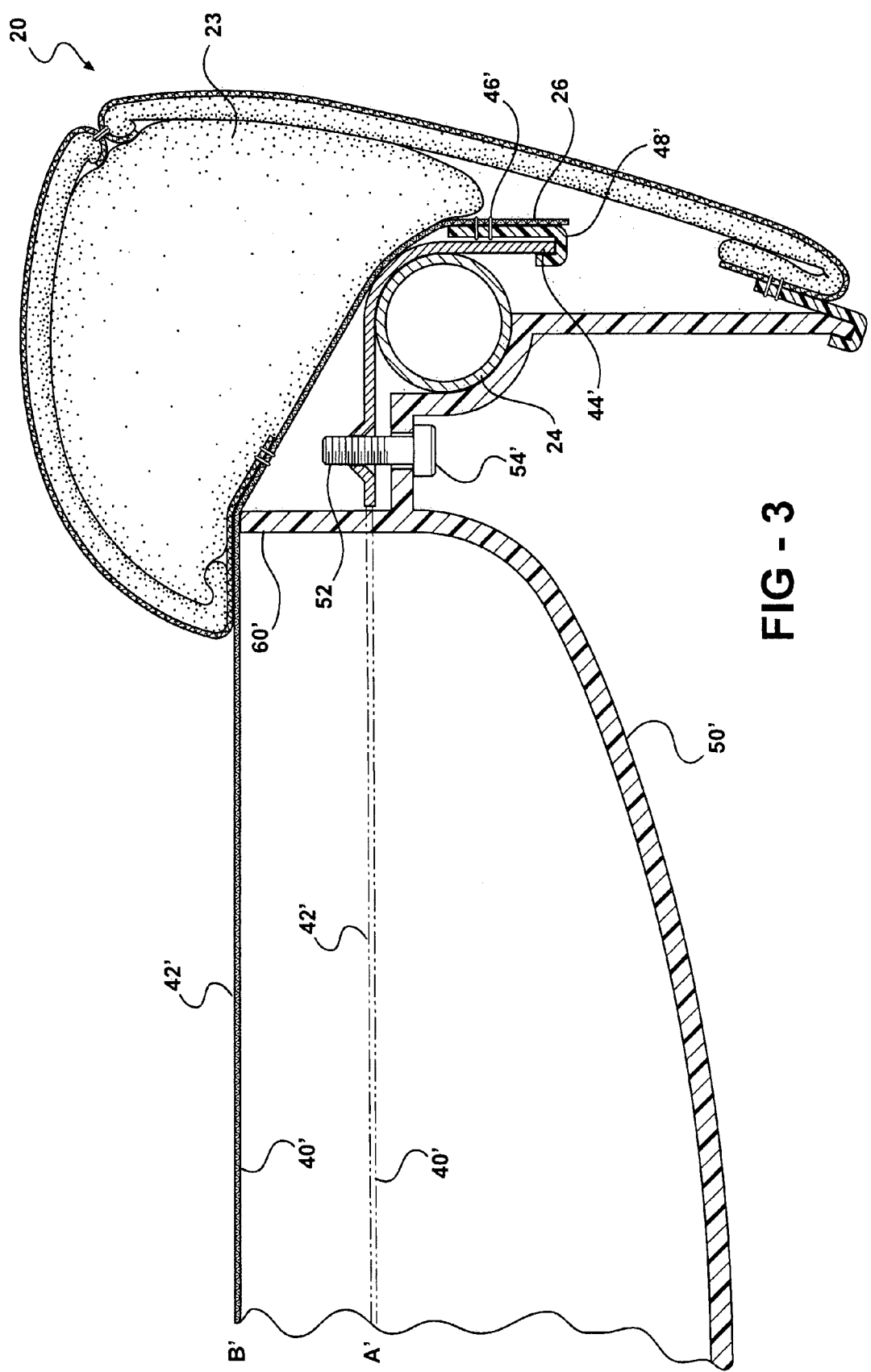
FIG. 3 is a cross sectional view of a seat cushion of the seat assembly.

Referring to FIG. 3, the seat cushion 20 is configured similarly to the seat back 30. Once again, only one half or side of the seat cushion 20 is shown, with the opposite half or side being a mirror image of that shown. A second flange 26 extends outwardly from each side member 24 of the seat cushion 20. A membrane suspension 40' presenting a seating surface 42' for supporting the occupant extends in tension between the side members 24. More specifically, the membrane suspension 40' includes terminal edges 44' each generally aligned with one of the respective side members 24. An extruded J-strip 46' having a hooked end 48' is sewn or formed along each edge 44'. The hooked end 48' is adapted to interlockingly engage the second flange 26, and thereby, support the membrane suspension 40' in tension between the side members 24 of the seat back 20. Alternatively, the membrane suspension 40' may be fixedly secured to the side members 24 by other suitable means, such as by passing bent hogrings through corresponding apertures formed along the terminal edges 44' and the respective side members 24.

A generally rigid trim panel 50' is fixedly assembled to the side members 24 of the seat cushion 20 by bolts 52 passing through a boss 54' formed in the panel 50' and a corresponding aperture formed in the second flange 26. Alternatively, the bolt 52, or other type of attachment member, may pass through the boss 54' and a corresponding aperture formed in a separate bracket welded to the side member 24 or formed in the side member 24 itself. An upstanding rib or wall 60' projects outwardly from the panel 50' and presses against the membrane suspension 40' to increase tension in the membrane suspension 40'. More specifically, as the bolts 52 are driven into the side members 24 during assembly of the panel 50' to the seat cushion 20, the wall 60' increasingly tensions and displaces the membrane suspension 40' from the position indicated as A' in FIG. 3 to the position indicated as B' in FIG. 3. That is, the deflection or displacement of the membrane suspension 40' by the engagement of wall 60' effectively shortens the length of the suspension 40' extending between the opposing side members 24 to increase the tension in the suspension 40'.

The invention has been described in an illustrative manner, and it is to be understood that the terminology, which has been used, is intended to be in the nature of words of description rather than of limitation.

Many modifications and variations of the present invention are possible in light of the above teachings. It is, therefore, to be understood that within the scope of the appended claims, the invention may be practiced other than as specifically described.

What is claimed is:

1. A seat assembly for use in supporting an occupant in an automotive vehicle comprising:

a seat frame having spaced apart side members wherein each of said side members includes a flange extending outwardly therefrom;

a membrane suspension for supporting the occupant of said seat assembly, said membrane suspension extending between and fixedly secured to said flange on each of said side members in a first tension position; and a panel adapted to be fixedly secured to said side members for concealing said flange and a portion of said seat frame, said panel including a rib projecting outwardly from said panel and engaging said membrane suspension to displace said membrane suspension from said first tension position to a second tension position thereby increasing the tension in said membrane suspension during assembly of said panel to said side members of said seat frame.

2. A seat assembly as set forth in claim 1 wherein said membrane suspension has at least two opposite terminal edges generally aligned with respective said side members for fixedly securing said membrane suspension to said flange on each of said side members.

3. A seat assembly as set forth in claim 2 wherein each of said terminal edges includes an extruded strip having a hooked end formed along said terminal edge, each said hooked end is adapted to lockingly engage with said flange on said respective side member to fixedly secure and to support said membrane suspension in said first tension position between said side members of said seat frame.

4. A seat assembly as set forth in claim 3 wherein said panel further includes a boss for passably allowing an attachment member therethrough, for use in fixedly securing said panel to said side members of said seat frame.

5. A seat assembly as set forth in claim 4 wherein each of said side members further includes an aperture for receiving said attachment member upon fixedly securing said panel to said side members of said seat frame by sliding said attachment member through said boss in said panel and into said aperture, such that as each of said attachment members are driven into said side members while fixedly securing said panel to said seat frame, said rib on said panel increasingly tensions said membrane suspension to a predetermined level of tension, thereby displacing said membrane suspension from said first tension position to said second tension position.

6. A seat assembly as set forth in claim 5 wherein said aperture is formed in each of said flanges on each of said side members.

7. A seat assembly as set forth in claim 5 wherein said aperture is formed in a side of each of said side members.

8. A seat assembly as set forth in claim 5 wherein said aperture is formed in a bracket independent from each of said side members and securably attached to each of said side members.

* * * * *